United States Patent
Kurihara (10) Patent No.: US 9,542,135 B2
(45) Date of Patent: Jan. 10, 2017

(54) IMAGE FORMING APPARATUS, IMAGE FORMING METHOD, AND NON-TRANSITORY COMPUTER READABLE MEDIUM FOR SAVING OPERATION HISTORY INFORMATION

(71) Applicant: FUJI XEROX CO., LTD., Tokyo (JP)

(72) Inventor: Yusaku Kurihara, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/851,667

(22) Filed: Sep. 11, 2015

(65) Prior Publication Data
US 2016/0274838 A1    Sep. 22, 2016

(30) Foreign Application Priority Data

Mar. 19, 2015 (JP) ................. 2015-056194

(51) Int. Cl.
*G06F 15/00* (2006.01)
*G06K 1/00* (2006.01)
*G06K 15/00* (2006.01)
*G06F 3/12* (2006.01)
*H04N 1/00* (2006.01)

(52) U.S. Cl.
CPC ......... *G06F 3/1238* (2013.01); *G06F 3/1204* (2013.01); *G06F 3/1273* (2013.01); *H04N 1/00411* (2013.01); *H04N 2201/0094* (2013.01)

(58) Field of Classification Search
CPC .... G06F 3/1238; G06F 3/1204; G06F 3/1273; H04N 2201/0094; H04N 1/00411
USPC ................. 358/1.1, 1.14, 1.16, 1.15
See application file for complete search history.

(56) References Cited

U.S. PATENT DOCUMENTS

| 7,760,381 | B2 | 7/2010 | Wakamatsu et al. |
| 8,582,158 | B2* | 11/2013 | Shimizu ............... G06F 3/1222 358/1.14 |
| 8,970,874 | B2* | 3/2015 | Hiruma .................. 358/1.15 |
| 9,202,154 | B2* | 12/2015 | Mizuno ............. G06K 15/4095 |

FOREIGN PATENT DOCUMENTS

| JP | 2003-54089 A | 2/2003 |
| JP | 2006-88591 A | 4/2006 |
| JP | 2011-104796 A | 6/2011 |

* cited by examiner

*Primary Examiner* — Douglas Tran
(74) *Attorney, Agent, or Firm* — Sughrue Mion, PLLC (57) ABSTRACT

An image forming apparatus includes a receiving unit, an image data generating unit, a memory, and a saving unit. The receiving unit receives a print instruction. The image data generating unit generates output image data in response to the print instruction received by the receiving unit. The memory stores specification information for specifying a print instruction for which operation history information is to be obtained. The saving unit saves, in a case where specification information on the print instruction received by the receiving unit matches the specification information stored in the memory, operation history information indicating that image formation processing has been performed by using the output image data in response to the print instruction.

10 Claims, 8 Drawing Sheets

IMAGE FORMING APPARATUS, IMAGE FORMING METHOD, AND NON-TRANSITORY COMPUTER READABLE MEDIUM FOR SAVING OPERATION HISTORY INFORMATION

CROSS-REFERENCE TO RELATED APPLICATIONS

This application is based on and claims priority under 35 USC 119 from Japanese Patent Application No. 2015-056194 filed Mar. 19, 2015.

BACKGROUND

Technical Field

The present invention relates to an image forming apparatus, an image forming method, and a non-transitory computer readable medium.

SUMMARY

According to an aspect of the invention, there is provided an image forming apparatus including a receiving unit, an image data generating unit, a memory, and a saving unit. The receiving unit receives a print instruction. The image data generating unit generates output image data in response to the print instruction received by the receiving unit. The memory stores specification information for specifying a print instruction for which operation history information is to be obtained. The saving unit saves, in a case where specification information on the print instruction received by the receiving unit matches the specification information stored in the memory, operation history information indicating that image formation processing has been performed by using the output image data in response to the print instruction.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described with reference to the attached drawings. Note that the exemplary embodiment described below is an example of an image forming apparatus, an image forming method, and a non-transitory computer readable medium storing a program for embodying the technical spirit of the present invention, does not intend to limit the present invention thereto, and is also equally adaptable to other exemplary embodiments included in the claims.

Figure 1:
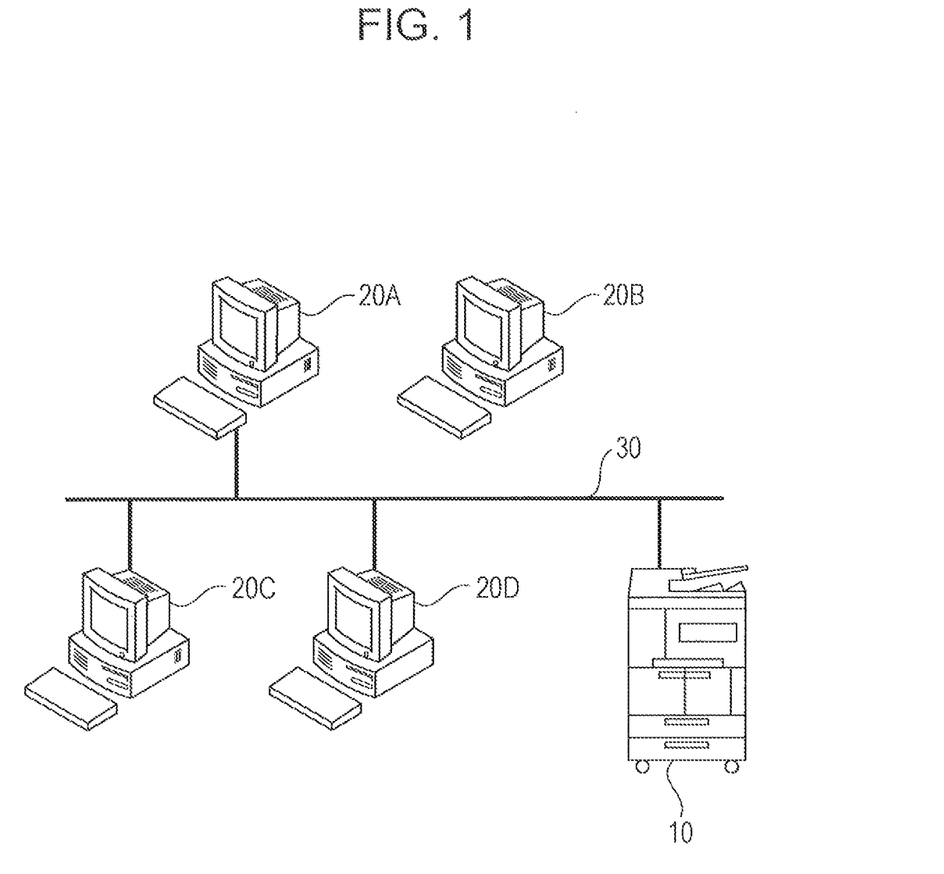
FIG. 1 is a diagram illustrating the configuration of an image forming system including an image forming apparatus according to the exemplary embodiment of the present invention.

FIG. 1 is a diagram illustrating the configuration of an image forming system including an image forming apparatus 10 according to an exemplary embodiment of the present invention.

The image forming system including the image forming apparatus 10 according to the exemplary embodiment of the present invention includes, as illustrated in FIG. 1, the image forming apparatus 10 and plural terminal apparatuses 20A to 20D that are connected to one another via a network 30. Hereinafter, one of these terminal apparatuses 20A to 20D is referred to as a terminal apparatus 20. The terminal apparatus 20 generates a print instruction and transmits the generated print instruction to the image forming apparatus 10 via the network 30. The image forming apparatus 10 receives a print job, which corresponds to the print instruction transmitted from the terminal apparatus 20, and outputs an image corresponds to the print job onto a sheet. The image forming apparatus 10 is an apparatus that is so-called a multifunction peripheral having plural functions, such as a print function, a scan function, a copy function, and a facsimile function.

Figure 2:
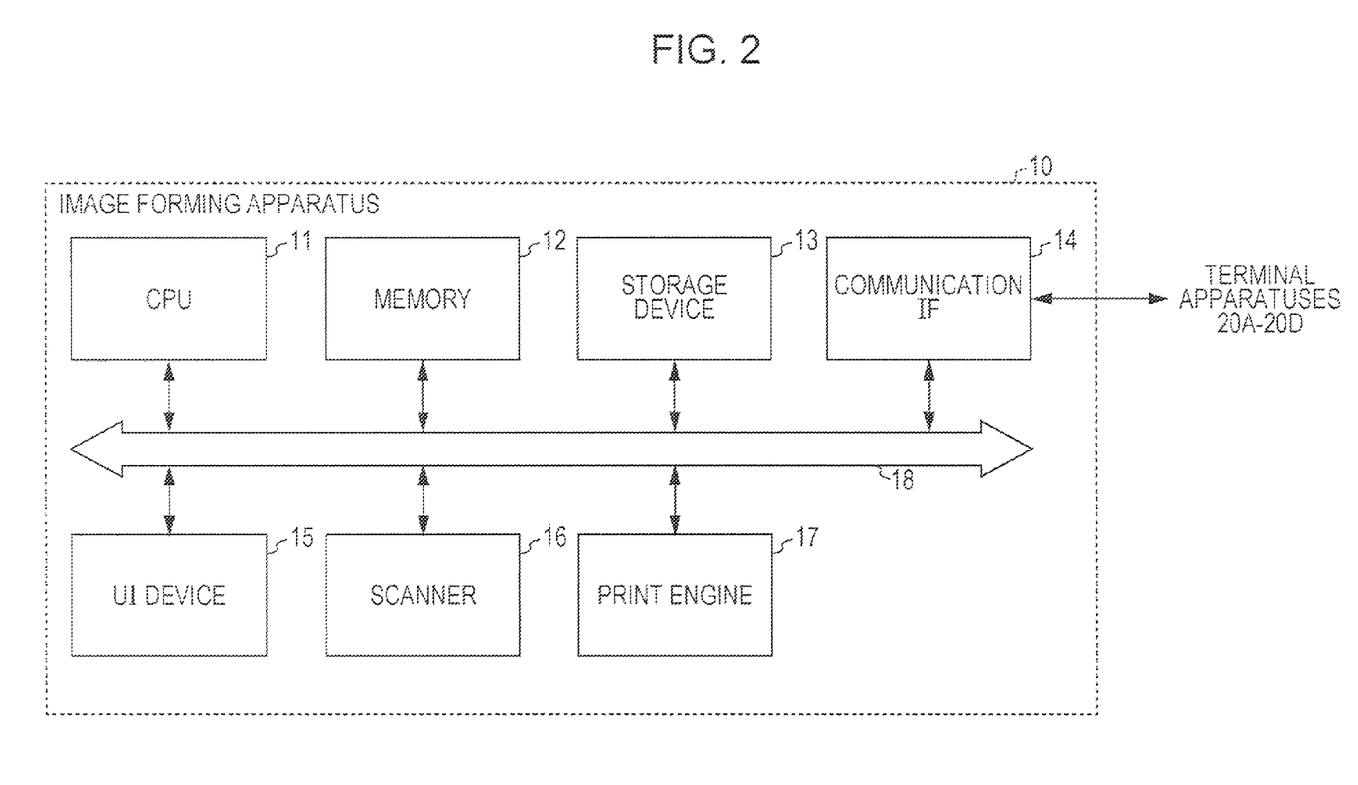
FIG. 2 is a diagram illustrating the hardware configuration of the image forming apparatus according to the exemplary embodiment.

The hardware configuration of the image forming apparatus 10 according to the exemplary embodiment will be described with reference to FIG. 2. FIG. 2 is a diagram illustrating the hardware configuration of the image forming apparatus 10 according to the exemplary embodiment.

The image forming apparatus 10 includes a central processing unit (CPU) 11, a memory 12, a storage device 13 such as a hard disk drive (HDD), a communication interface (IF) 14 serving as a transmitting unit and a receiving unit that transmit data to and receive data from an external apparatus via the network 30, a user interface (UI) device 15 including a touch panel or a liquid crystal display and a keyboard, a scanner 16, and a print engine 17. These elements are connected to one another via a control bus 18.

The CPU 11 executes certain processing in accordance with a control program stored in the memory 12 or the storage device 13 and controls the operation of the image forming apparatus 10.

In the exemplary embodiment, the CPU 11 is described as a device that reads and executes the control program stored in the memory 12 or the storage device 13. The control program may be stored in a storage medium such as a compact disc read only memory (CD-ROM) and may be provided to the CPU 11.

Figure 3:
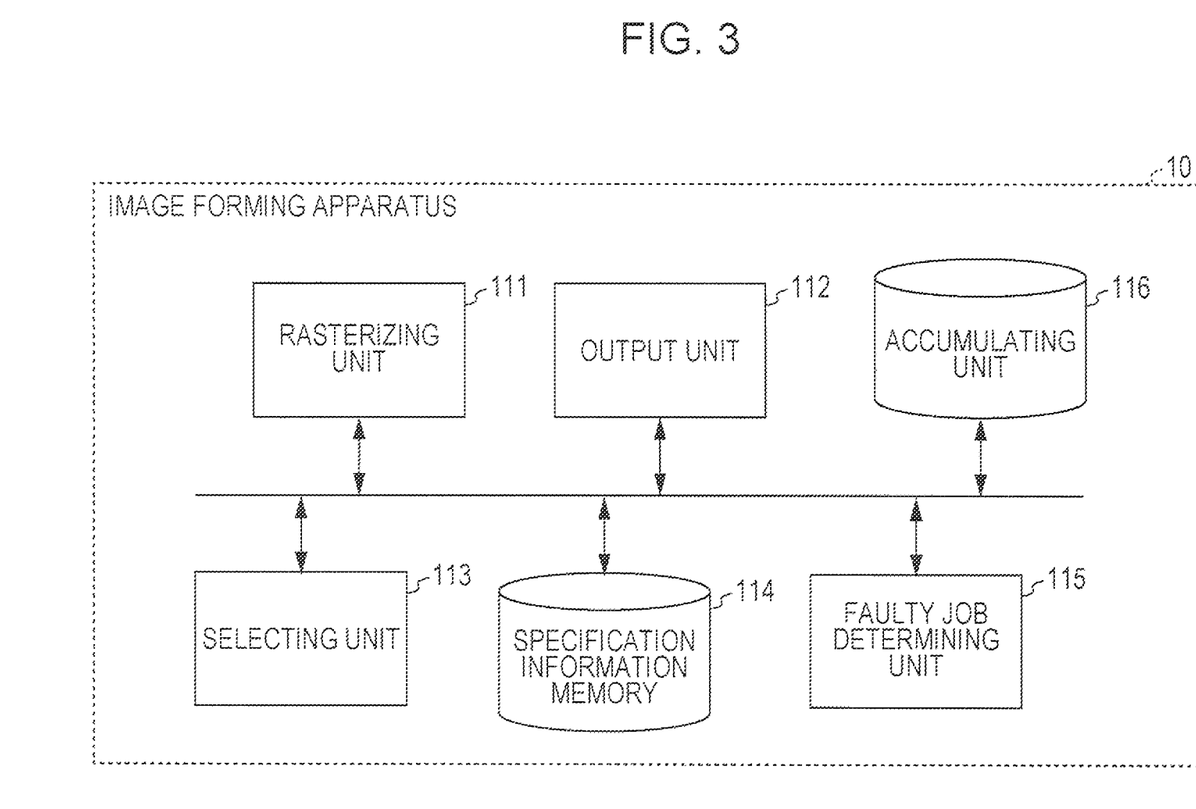
FIG. 3 is a diagram illustrating the functional configuration of the image forming apparatus according to the exemplary embodiment.

FIG. 3 is a block diagram illustrating the functional configuration of the image forming apparatus 10 that is implemented when the above-described control program is executed.

As illustrated in FIG. 3, the image forming apparatus 10 according to the exemplary embodiment includes a rasterizing unit 111 serving as an image data generating unit, an output unit 112, a selecting unit 113, a specification information memory 114 serving as a memory that stores specification information for specifying a print job for which operation history information is to be obtained, a faulty job determining unit 115, and an accumulating unit 116 serving as a saving unit.

Here, specification information is information that is necessary to specify a print job. Examples of the specification information include user identification information such as a user name of a user who has transmitted the print job, a host name of the terminal apparatus 20 that has transmitted the print job, terminal identification information such as an IP address of a transmission source, and job identification information such as a job name of the print job.

A faulty job is a print job resulting in an output image that is generated through normal image formation processing of the image forming apparatus 10 and that is different from the one desired by a user, that is, a print job resulting in an output image having some fault, such as character corruption or layout breakdown.

The rasterizing unit 111 generates output image data on the basis of a print job, which is a print instruction received by the communication IF 14. Specifically, the rasterizing unit 111 converts the data format of the print job received by the communication IF 14 into output image data format that is necessary for image formation.

The output unit 112 outputs an image onto a recording medium, such as a sheet, by using the print engine 17 on the basis of the output image data obtained through the conversion performed by the rasterizing unit 111.

The selecting unit 113 selects a print job for which specification information is to be set, from among print jobs that have been executed by operating the UI device 15 and that are represented by history information. The specification information memory 114 stores specification information on the print job selected by the selecting unit 113. In the exemplary embodiment, a print setting and print status of the selected print job are also stored in association with the specification information.

The print setting is setting information that is necessary for image formation, such as a sheet size, which is the size of a sheet on which an image is formed, a sheet orientation, which is the orientation of a sheet on which an image is formed, a selected tray, which is a tray on which a sheet used for forming an image is stored, a color selected for forming an image, and a surface on which an image is formed. The print status is a status of functions of the image forming apparatus 10, such as whether or not there is a sheet on the tray and whether or not there is ink or toner.

The faulty job determining unit 115 determines whether or not specification information on a received print job matches specification information stored in the specification information memory 114, and thereby determines whether or not the received print job matches a faulty job. The detailed operation will be described below.

The accumulating unit 116 saves log information (operation history information) indicating that image formation processing has been performed on the basis of a print job that is determined to match a faulty job by the faulty job determining unit 115. In addition to the log information, print job information on the faulty job may also be saved in association with the log information.

Figure 4:
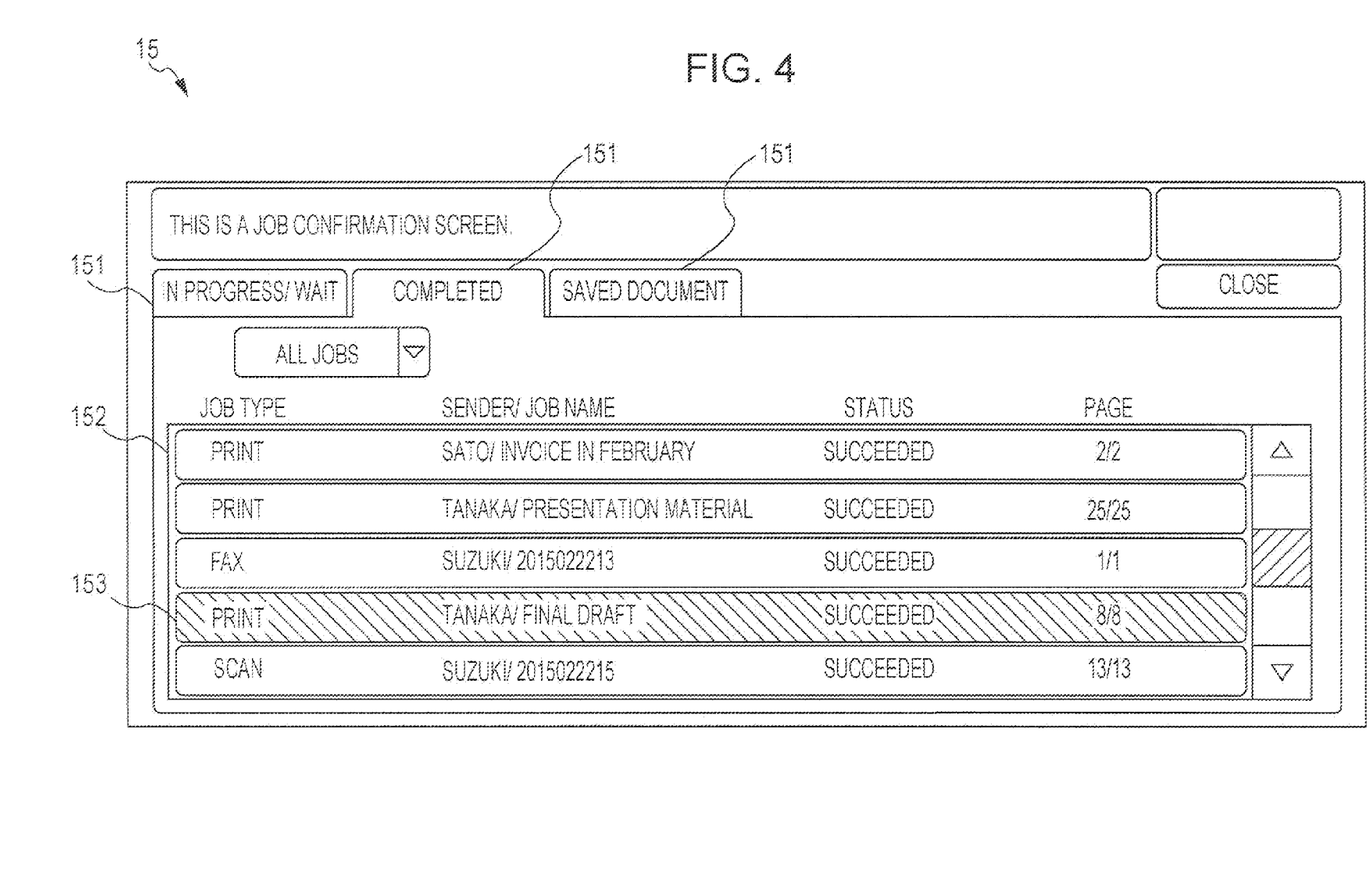
FIG. 4 illustrates an example of a job confirmation screen displayed on a UI device of the image forming apparatus according to the exemplary embodiment.

Next, an operation for registering a print job output from the image forming apparatus 10 according to the exemplary embodiment as a faulty job will be described with reference to FIGS. 4 and 5.

Images that are necessary to operate the image forming apparatus 10, such as images for a printer, scanner, facsimile, and job confirmation, are displayed on a display serving as a screen of the UI device 15. Upon job confirmation being selected through an operation of the UI device 15, the screen of the UI device 15 changes to the job confirmation image illustrated in FIG. 4.

The job confirmation image includes plural tabs 151 with which jobs received by the image forming apparatus 10 are categorized using plural items, and a job list area 152 showing a list of jobs categorized by an item corresponding to a selected one of the tabs 151. The jobs include jobs implemented by the functions of the image forming apparatus 10, such as a scan job and a facsimile job, as well as a print job.

In the job list area 152, the user is able to visually check, for each received job, the type of the job, the name of the user who has transmitted the job, the name of the job, the current state of the job, and the number of pages of the job.

The user of the image forming apparatus 10 selects a job 153, which is a faulty job, from among the jobs displayed in the job list area 152.

Figure 5:
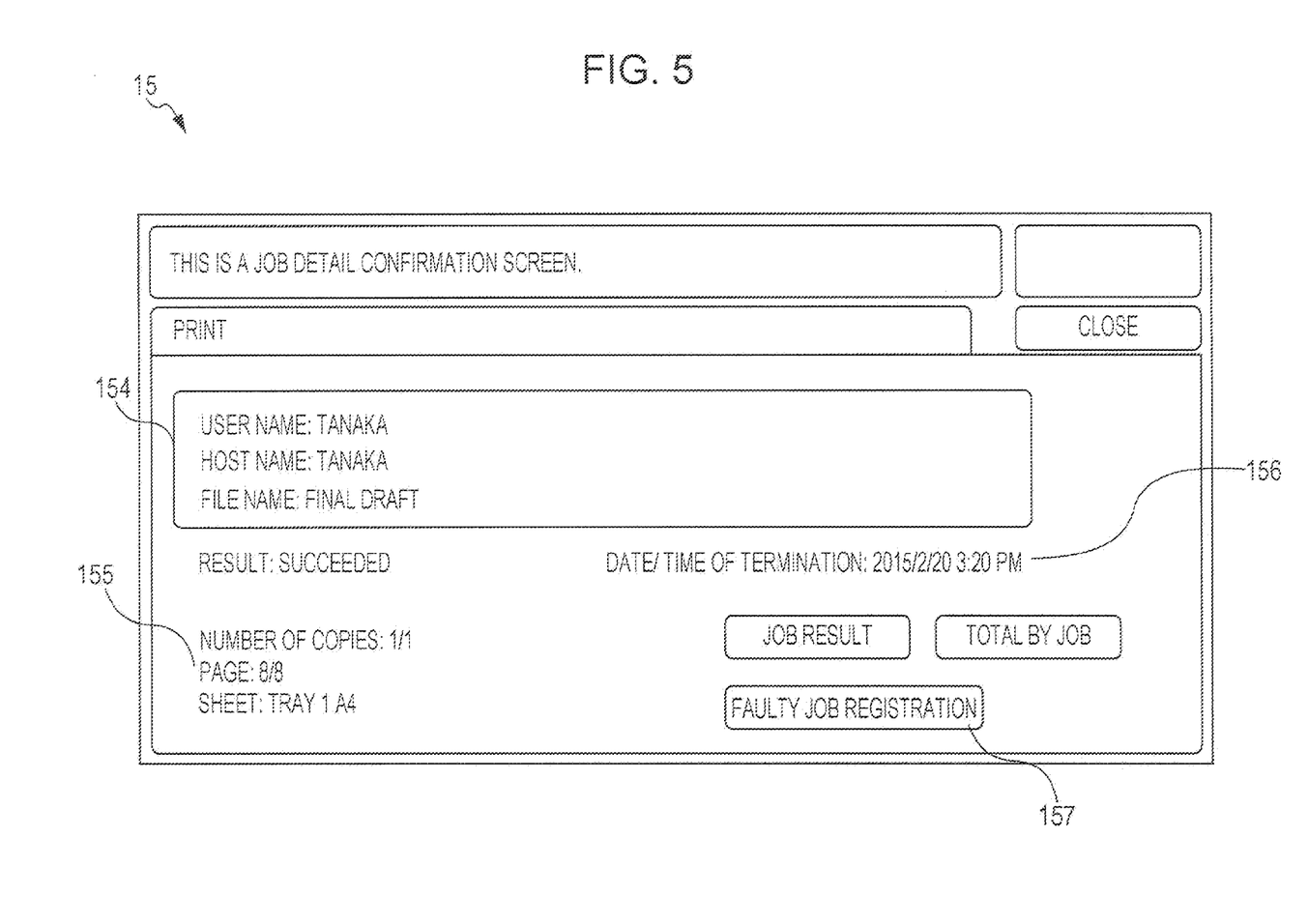
FIG. 5 illustrates an example of a job detail confirmation screen displayed on the UI device of the image forming apparatus according to the exemplary embodiment.

After a certain job is selected from among the jobs displayed on the job confirmation image, the display on the UI device 15 changes to a job detail confirmation image as illustrated in FIG. 5. FIG. 5 illustrates an example of the job detail confirmation image that is displayed in a case where the job 153 is selected. The job detail confirmation image includes an identification information confirmation area 154, a setting information confirmation area 155, an execution result information confirmation area 156, and a faulty job registration button 157.

In the identification information confirmation area 154, the user name of the terminal apparatus 20, which is identification information on the user who has transmitted the print job, the host name of the terminal apparatus 20, which is identification information on the terminal apparatus that has transmitted the print job, and a file name, which is the identification information on the transmitted print job, may be visually checked. In addition, the IP address of the terminal apparatus 20 that has transmitted the print job may be displayed.

In the setting information confirmation area 155, the number of copies printed, which is a print setting for output of the print job, the number of pages printed, the size of a printing sheet, the tray used for output, and so forth may be visually checked. In addition, the color and the printing surface used for output may be displayed.

In the execution result information confirmation area 156, an execution result, which is an image output result of the print job, and the date and time when the image is output, may be visually checked.

The faulty job registration button 157 is used to register the currently selected print job as a faulty job. With selection of the faulty job registration button 157 by the user, the specification information, print setting, and print status of the corresponding print job are stored in the specification information memory 114 in association with one another.

In the exemplary embodiment, all of the specification information, print setting, and print status are stored in the specification information memory 114 when the faulty job registration button 157 is selected, but information to be stored may be selected.

Figure 6:
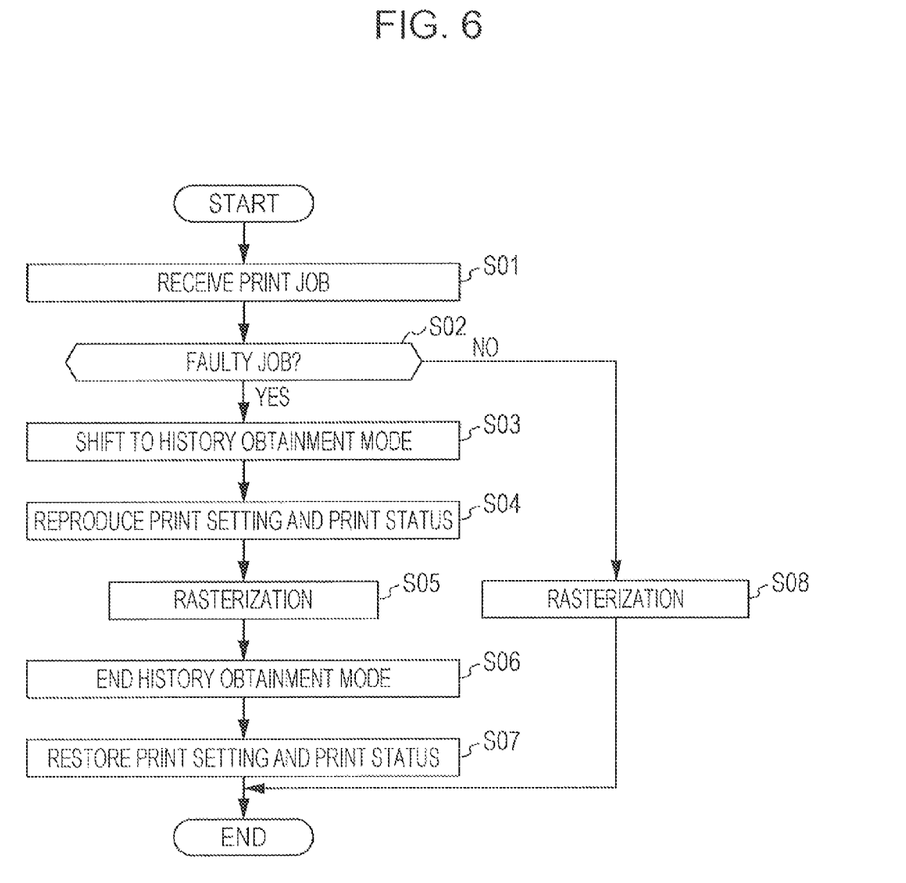
FIG. 6 is a flowchart of operation history obtainment processing according to the exemplary embodiment.

Next, log information (operation history information) obtainment processing in the image forming apparatus 10 according to the exemplary embodiment will be described with reference to FIG. 6. FIG. 6 is a flowchart of the log information obtainment processing.

First, a print job, which is a print instruction transmitted from the terminal apparatus 20, is received by the communication IF 14 via the network 30 (step S01).

Subsequently, the faulty job determining unit 115 analyzes specification information included in the received print job, compares the analyzed specification information with specification information stored in the specification information memory 114, and determines whether or not both the pieces of specification information are identical to each other (step S02).

In the exemplary embodiment, a comparison is made for each of the user name, the host name, the IP address of the transmission source, and the job name of the print job. If both the pieces of specification information match in all the items, it is determined that both the pieces of specification information are identical to each other. Alternatively, it may be determined that both the pieces of specification information are identical to each other if one or more of the user name, the host name, the IP address of the transmission source, and the job name of the print job match. Alternatively, the print setting may be simultaneously analyzed in addition to the specification information. If the print settings also match, it may be determined that both the print settings are identical to each other.

If it is determined in step S02 by the faulty job determining unit 115 that the specification information included in the received print job matches the specification information stored in the specification information memory 114, the specification information included in the print job is saved in the accumulating unit 116, and the mode shifts to a history obtainment mode (step S03).

If it is determined in step S02 by the faulty job determining unit 115 that the specification information included in the received print job does not match the specification information stored in the specification information memory 114, the rasterizing unit 111 rasterizes the print job to generate output image data (step S08), and the processing ends.

After the mode shifts to the history obtainment mode in step S03, the print setting and print status of the image forming apparatus 10 are reproduced as the same print setting and print status as the print setting and print status associated with the specification information that is stored in the specification information memory 114 and that has been determined to match (step S04). If the associated print setting and print status do not exist, the initial setting predetermined in the image forming apparatus 10 and the current print status are set. Here, it is difficult to actually reproduce the print status. Thus, the print status may be virtually reproduced by the CPU 11 without changing the print status.

Subsequently, the rasterizing unit 111 rasterizes the print job to generate output image data (step S05), saves the print job, the output image data, and the log information in the accumulating unit 116 in association with the specification information saved in step S03, and the history obtainment mode ends (step S06).

After the history obtainment mode ends, the print setting and print status reproduced in step S04 are restored to those before the history obtainment mode (step S07), and the processing ends. In the exemplary embodiment, a description is given of the processing from the start to the output image data generation processing performed by the rasterizing unit 111. However, after the output image data generation processing ends, the output unit 112 may perform output to a recording medium on the basis of the output image data. Also, after the history obtainment mode has ended, the specification information used to obtain log information and the print setting and print status associated with the specification information may be deleted from the specification information memory 114.

Modification Example

Figure 7:
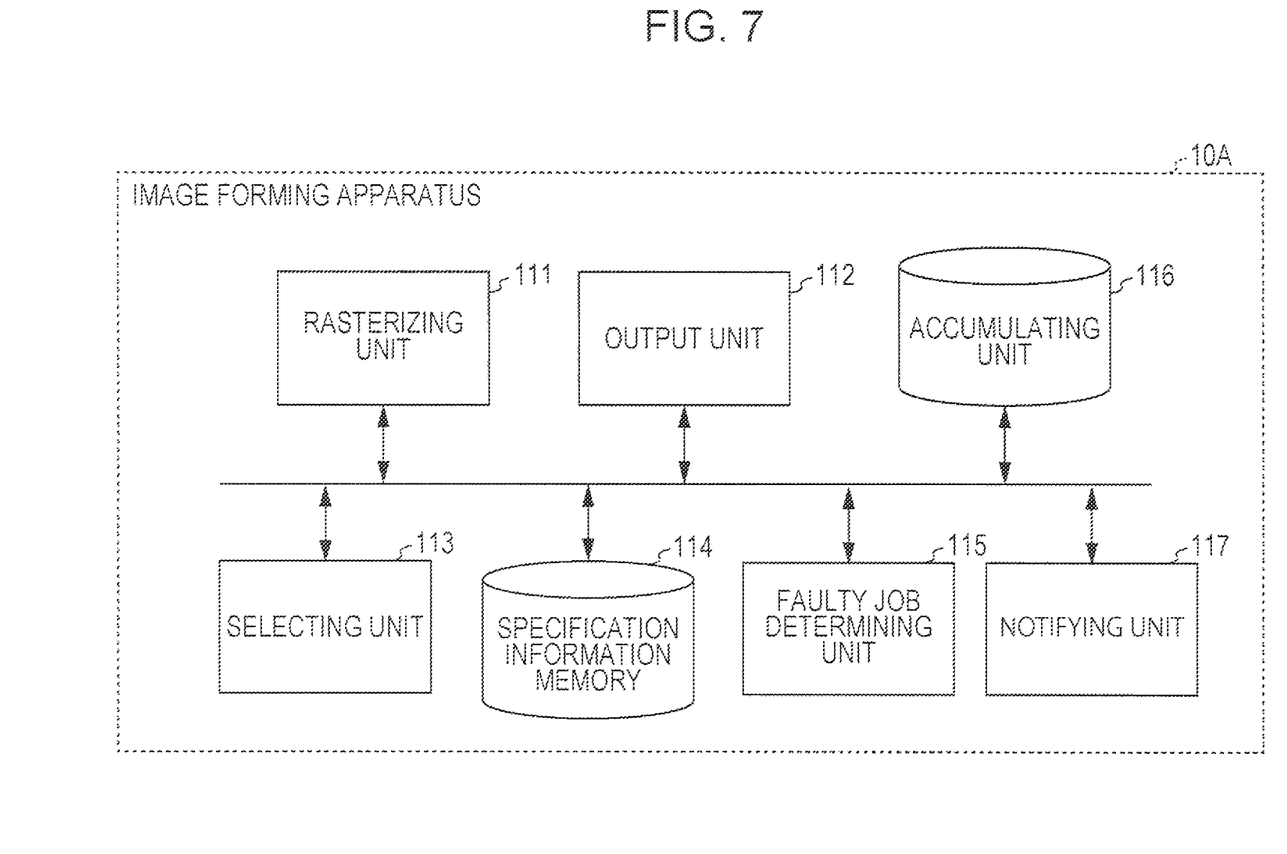
FIG. 7 is a diagram illustrating the functional configuration of an image forming apparatus according to a modification example.
Figure 8:
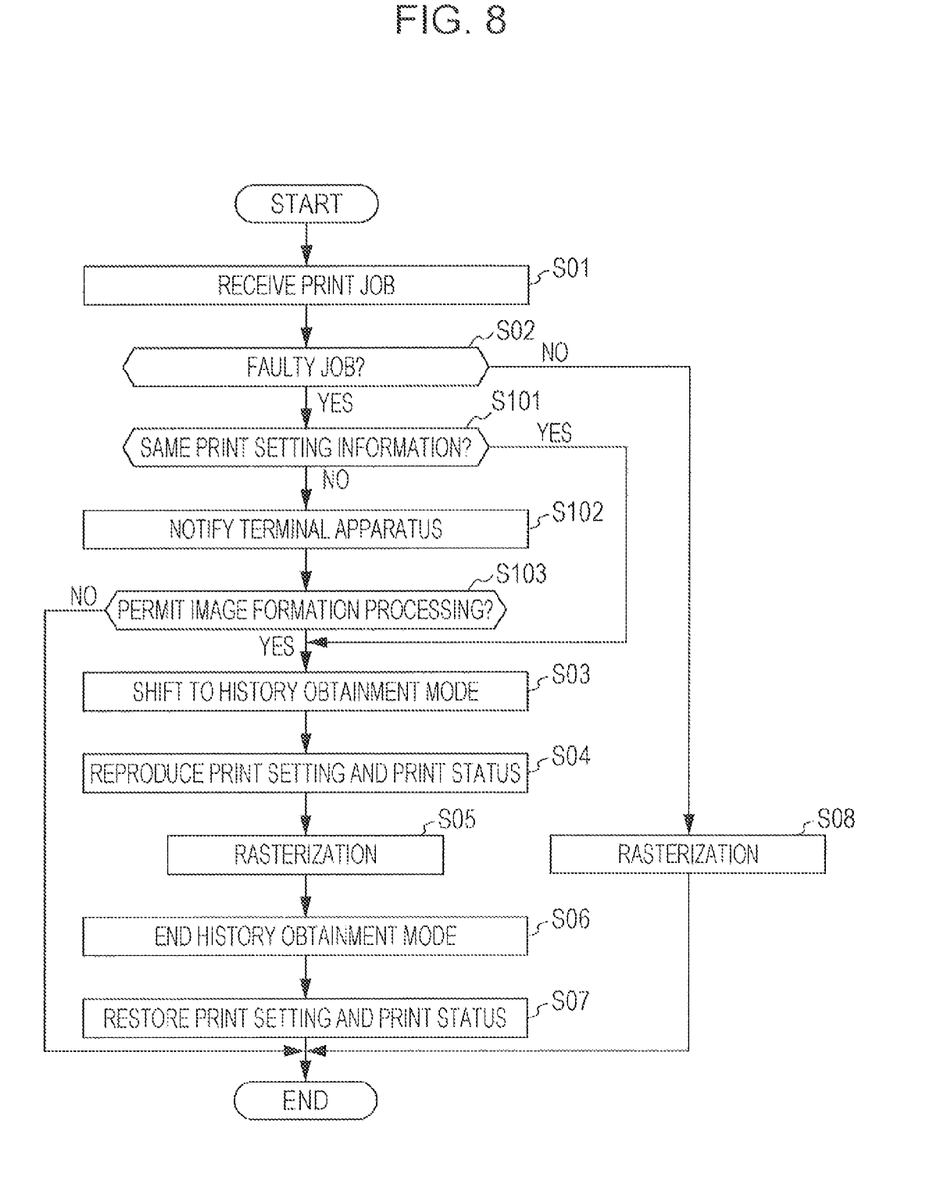
FIG. 8 is a flowchart of operation history obtainment processing according to the modification example.

A modification example of operation history obtainment processing in the image forming apparatus according to the exemplary embodiment will be described with reference to FIGS. 7 and 8. FIG. 7 is a diagram illustrating the functional configuration of an image forming apparatus 10A according to the modification example, and FIG. 8 is a flowchart of operation history obtainment processing according to the modification example. The same parts as those according to the above-described embodiment are denoted by the same reference numerals, and the description thereof is omitted.

In the modification example, the image forming apparatus 10A includes a notifying unit 117 in addition to the components according to the above-described exemplary embodiment. The notifying unit 117 notifies the terminal apparatus 20 via the network 30 by using the communication interface 14. The processing performed by the notifying unit 117 will be described in detail by using the flowchart illustrated in FIG. 8.

If it is determined in step S02 by the faulty job determining unit 115 that the specification information included in the received print job matches the specification information stored in the specification information memory 114, the faulty job determining unit 115 analyzes the print setting information included in the received print job, compares the analyzed print setting information with the print setting information stored in the specification information memory 114, and determines whether or not both the pieces of print setting information match (step S101).

If it is determined in step S101 that both the pieces of print setting information match, the processing proceeds to step S03. If it is determined in step S101 that both the pieces of print setting information do not match, the notifying unit 117 notifies, via the network 30 by using the communication interface 14, the terminal apparatus 20 specified by the specification information that both the pieces of print setting information do not match (step S102).

In response to the notification, the terminal apparatus 20 determines whether or not to permit the continuation of the image formation processing (step S103). If the continuation of the image formation processing is permitted, the processing proceeds to step S03. If the continuation of the image formation processing is not permitted, the processing ends.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a communication interface configured to receive a print instruction;

at least one processor configured to execute an image data generating unit configured to generate output image data in response to the print instruction received by the communication interface;

a memory configured to be controlled by the at least one processor to store specification information for specifying a print instruction for which operation history information is to be obtained;

wherein the at least one processor is further configured to execute a saving unit configured to save, in a case where specification information of the print instruction received by the communication interface matches the specification information stored in the memory, operation history information indicating that image formation processing has been performed by using the output image data in response to the print instruction; and wherein the at least one processor is further configured to execute a faulty job determining unit configured to, after shifting to a history obtainment mode, and in response to determining that the specification information of the print instruction received by the communication interface matches the specification information stored in the memory, control a print setting and a print status of the image forming apparatus to be reproduced as a same print setting and print status as a print setting and a print status associated with the specification information stored in the memory.

2. The image forming apparatus according to claim 1, wherein the at least one processor is further configured to execute a selecting unit configured to select, from among executed print instructions represented by history information, a print instruction for which specification information is to be set, wherein the memory is configured to store specification information on the print instruction selected by the selecting unit.

3. The image forming apparatus according to claim 1, wherein the specification information includes at least one of identification information of a user, identification information of a terminal apparatus that has transmitted a print instruction, and identification information of the print instruction.

4. The image forming apparatus according to claim 1, wherein the saving unit is configured to, in a case where the specification information of the print instruction received by the communication interface matches the specification information stored in the memory, save the print instruction and the operation history information indicating that image formation processing has been performed by using the output image data in response to the print instruction in association with each other.

5. The image forming apparatus according to claim 1, wherein the memory is configured to store, in addition to the specification information, setting information regarding a setting for image formation using the print instruction and status information regarding a status of the image forming apparatus when the print instruction is executed.

6. The image forming apparatus according to claim 5, wherein the image forming apparatus is configured to, in a case where the specification information of the print instruction received by the communication interface matches the specification information stored in the memory, perform image formation processing by using the setting information and status information stored in the memory.

7. The image forming apparatus according to claim 5, wherein the at least one processor is further configured to execute a notifying unit that configured to transmit a notification to a terminal apparatus that has transmitted the print instruction in a case where the specification information of the print instruction received by the communication interface matches the specification information stored in the memory and in a case where setting information of the print instruction received by the communication interface does not match the setting information stored in the memory.

8. The image forming apparatus according to claim 1, wherein the at least one processor is further configured to execute a deleting unit configured to delete the specification information that is stored in the memory and that has been used to save the operation history information in the saving unit.

9. An image forming method comprising:

receiving a print instruction;

generating output image data in response to the received print instruction;

storing specification information for specifying a print instruction for which operation history information is to be obtained;

saving, in a case where specification information of the received print instruction matches the stored specification information, operation history information indicating that image formation processing has been performed by using the output image data in response to the print instruction; and after switching to a history obtainment mode, and in response to determining that the specification information of the received print instruction matches the stored specification information, controlling a print setting and a print status of an image forming apparatus to be reproduced as a same print setting and print status as a print setting and a print status associated with the stored specification information.

10. A non-transitory computer readable medium storing a program causing a computer to execute a process, the process comprising:

receiving a print instruction;

generating output image data in response to the received print instruction;

storing specification information for specifying a print instruction for which operation history information is to be obtained;

saving, in a case where specification information of the received print instruction matches the stored specification information, operation history information indicating that image formation processing has been performed by using the output image data in response to the print instruction; and after switching to a history obtainment mode, and in response to determining that the specification information of the received print instruction matches the stored specification information, controlling a print setting and a print status of an image forming apparatus to be reproduced as a same print setting and print status as a print setting and a print status associated with the stored specification information.

* * * * *